United States Patent [19]

Tanaka et al.

[11] 3,969,766

[45] July 13, 1976

[54] TENSION CONTROL DEVICE FOR A VIDEO TAPE RECORDING AND/OR REPRODUCING APPARATUS

[75] Inventors: Katsuo Tanaka, Tokyo; Akira Saito, Yokohama, both of Japan

[73] Assignee: Sony Corporation, Tokyo, Japan

[22] Filed: Nov. 12, 1974

[21] Appl. No.: 523,279

[30] Foreign Application Priority Data
Nov. 16, 1973    Japan.......................... 48-132484[U]

[52] U.S. Cl................................ 360/85; 242/75.43; 242/189; 360/72; 360/132
[51] Int. Cl.².................. G11B 15/66; G11B 15/43; G11B 5/52; G11B 23/04
[58] Field of Search .................. 360/85, 71, 84, 93, 360/95, 96, 132, 134; 242/75, 75.1, 75.2, 75.3, 75.4, 75.43, 189–191; 226/95, 195

[56] References Cited
UNITED STATES PATENTS

| | | | |
|---|---|---|---|
| 3,374,962 | 3/1968 | Dunsheath................. | 242/75.43 |
| 3,380,680 | 4/1968 | Dunsheath et al............ | 242/75.43 |
| 3,580,525 | 5/1971 | Dopner...................... | 242/75 |
| 3,621,149 | 11/1971 | Wada et al.................. | 360/71 |
| 3,673,348 | 6/1972 | Larkin ...................... | 360/85 |
| 3,697,016 | 10/1972 | Leifer et al................. | 242/75.43 |
| 3,764,757 | 10/1973 | Inaga ....................... | 360/85 |
| 3,769,470 | 10/1973 | Curtis ...................... | 360/71 |

Primary Examiner—Alfred H. Eddleman
Attorney, Agent, or Firm—Lewis H. Eslinger; Alvin Sinderbrand

[57] ABSTRACT

A tension control device, particularly for an apparatus recording and/or reproducing video signals on a tape which is wound on and extends between supply and take-up reels, includes a pivoted tension control arm urged by a tensioning spring against a run of the tape between the reels for detecting the tape tension and correspondingly controlling a brake resisting rotation of the supply reel so as to maintain the tape tension at a level determined by the spring force, and the spring force is made adjustable for varying the tape tension which is to be maintained by connecting the tensioning spring to a movable anchor member which is substantially counter-balanced, for example, by another spring acting on the anchor member in opposition to the tensioning spring. Movements of the anchor member for adjusting the force of the tensioning spring are effected by a manually actuable control element preferably having an irreversible coupling to the anchor member which provides a substantial mechanical advantage, for example, in the form of a cam member turnable with the control element and engaged by a cam follower on the movable anchor member.

8 Claims, 4 Drawing Figures

TENSION CONTROL DEVICE FOR A VIDEO TAPE RECORDING AND/OR REPRODUCING APPARATUS

BACKGROUND OF THE INVENTION

1. Field of the Invention

This invention relates generally to magnetic recording and/or reproducing apparatus, such as, video tape recording and/or reproducing apparatus (VTR), and more particularly is directed to improvements in a tension control device for such apparatus.

2. Description of the Prior Art

Existing video tape recording and/or reproducing apparatus generally comprise a tape guide drum having one or more rotary magnetic heads associated therewith to record or reproduce video signals on a magnetic tape which is wound on supply and take-up reels with the tape between such reels being wrapped helically about at least a portion of the circumferential surface of the drum and being driven by a cooperating capstan and pinch roller and by suitable rotation of the take-up reel. It will be apparent that, during a recording operation of the foregoing apparatus, each rotary magnetic head will travel obliquely across the tape at an angle to the longitudinal direction of the latter that is determined primarily by the helical path of the tape on the guide drum, the rotational speed of the rotary magnetic heads and the longitudinal speed at which the tape is driven by the capstan, whereby to record the video signals in successive parallel record tracks that are similarly obliquely related to the tape. When reproducing video signals previously recorded in the oblique record tracks, either by means of the same or a similar recording and/or reproducing apparatus, the rotational speed of the rotary magnetic heads and the speed at which the tape is longitudinally driven are controlled by suitable servo systems so that each rotary head, as it commences a scanning movement obliquely across the tape, will be aligned with a record track. If the magnetic tape is considered to be dimensionally stable, and assuming that the previously mentioned factors determining the angle of the oblique record tracks are the same for the reproducing operation as for the recording operation, then each rotary magnetic head will scan precisely along an oblique record track for reproducing the video signals recorded therein. However, the magnetic tape, being usually formed of a plastic film with a magnetic coating thereon, is not dimensionally stable, that is, its length may be varied by changes in temperature, humidity and tension. It will be apparent that, if the length of the tape changes between the recording and reproducing operations, then the paths along which the rotary magnetic heads scan the tape during the reproducing operation will be at a small angle to the oblique record tracks in which the video signals are recorded. Therefore, even though each head is aligned with a record track at the commencement of its scanning movement obliquely across the tape, the head will deviate from that record track in the course of the scanning movement and the reproduced video signals will contain guard band noises which result in a characteristic "snow" or disturbance in the picture or image displayed by a monitor or other image display device.

It is known to eliminate the above mentioned guard band noises during reproducing operations by suitably varying the tension in the tape so as to compensate for any changes in the longitudinal dimensions thereof that may have occured between the recording and reproducing operations. In existing video tape recording and/or reproducing apparatus, the tape is usually tensioned during recording and reproducing operations by means of a brake which resists rotation of the supply reel, with the braking force applied by such brake being varied in accordance with the tension in a run of the tape between the guide drum and the supply reel.

For example, as disclosed in U.S. Pat. No. 3,833,921, issued Sept. 3, 1974, and having a common assignee herewith, a pivotally mounted tension control arm may be provided with a pin at its free end pressed against a run of the tape between the guide drum and the supply reel by means of a spring acting on the arm. Further, the tension control arm is connected to a band brake which extends around a brake drum on a rotatable supply reel support member to resist rotation of the latter, and hence of a supply reel rotatably coupled therewith. It will be apparent that, in the foregoing arrngement, the position of the tension control arm is at all times determined by the force of the spring urging such arm to turn in one direction and by the tension in the tape run engaged by the pin on the tension control arm for resisting turning of the latter in that direction. The band brake is arranged so that a movement of the tension control arm in one direction in response to a decrease in the detected tape tension increases the braking force so as to restore the tape tension to a predetermined value, whereas a movement of the tension control arm in the opposite direction in response to an increase in the detected tape tension decreases the braking force for again restoring the tape tension to the predetermined value. Thus, the described arrangement tends to maintain a constant tape tension which is determined by the force of spring acting on the tension control arm. In order to permit adjustment of the tape tension which is to be maintained, the existing apparatus connects one end of the spring to the tension control arm while the opposite end of the spring is connected to an angularly adjustable anchor arm. Therefore, in theory, when guard band noises appear in the reproduced video signals by reason of changes in the longitudinal dimensions of the tape between recording and reproducing operations, the anchor arm for the spring can be angularly adjusted to change the spring force, and hence the tape tension, in the sense required for returning the tape to its longitudinal dimensions during recording and thereby eliminating the guard band noises.

However, it has been found that, in practice, the necessarily fine adjustment of the tape tension cannot be easily achieved by angular adjustment of the anchor arm which is normally locked in a selected position. The foregoing difficulty results from the fact that, when the lock retaining the anchor arm in a selected position is released to permit angular adjustment of the anchor arm, the full force of the associated spring tends to turn the anchor arm in the direction to reduce the spring force. Therefore, the adjustment of the anchor arm has to be effected against the full force of the associated spring which interferes with the precise relocation of the anchor arm to achieve the required precise adjustment of the tape tension.

OBJECTS AND SUMMARY OF THE INVENTION

Accordingly, it is an object of this invention to provide a tension control device which avoids the above described difficulties of the prior art, and more particularly, which facilitates the precise adjustment of the tape tension in a video tape recording and/or reproducing apparatus, as aforesaid, for eliminating guard band noises that would otherwise appear in the reproduced video signals by reason of dimensional changes occurring in the tape between the recording and reproducing operations.

In accordance with an aspect of the invention, a tension control device that includes a movable tension control arm urged against a run of the tape between the supply and take-up reels by means of a tensioning spring so that the positioning of such arm is dependent on the force of the tensioning spring and the tension in the engaged tape run, a brake controllable by the positioning of the tension control arm for resisting rotation of the supply reel so as to maintain a substantially constant tension in the tape run and an anchor member connected with the tensioning spring and being movable for adjusting the force of the tensioning spring and thereby varying the substantially constant tension to be maintained in the tape run; is provided with an arrangement for counterbalancing the force of the tensioning spring in respect to the anchor member, for example, by providing an additional spring which acts on the anchor member in opposition to the force of the tensioning spring, so that the anchor member can be adjustably moved without having to overcome the force of the tensioning spring.

It is a further feature of the invention to provide the foregoing tension control device with a manually actuable control element, such as a rotatable knob, and with an irreversible coupling connected between such control element and the anchor member for providing a substantial mechanical advantge in respect to displacement of the control element relative to the resulting movement of the anchor member.

The above, and other objects, features and advantges of this invention, will be apparent from the following detailed description of an illustrative embodiment thereof which is to be read in connection with the accompanying drawings.

DESCRIPTION OF A PREFERRED EMBODIMENT

Figure 1:
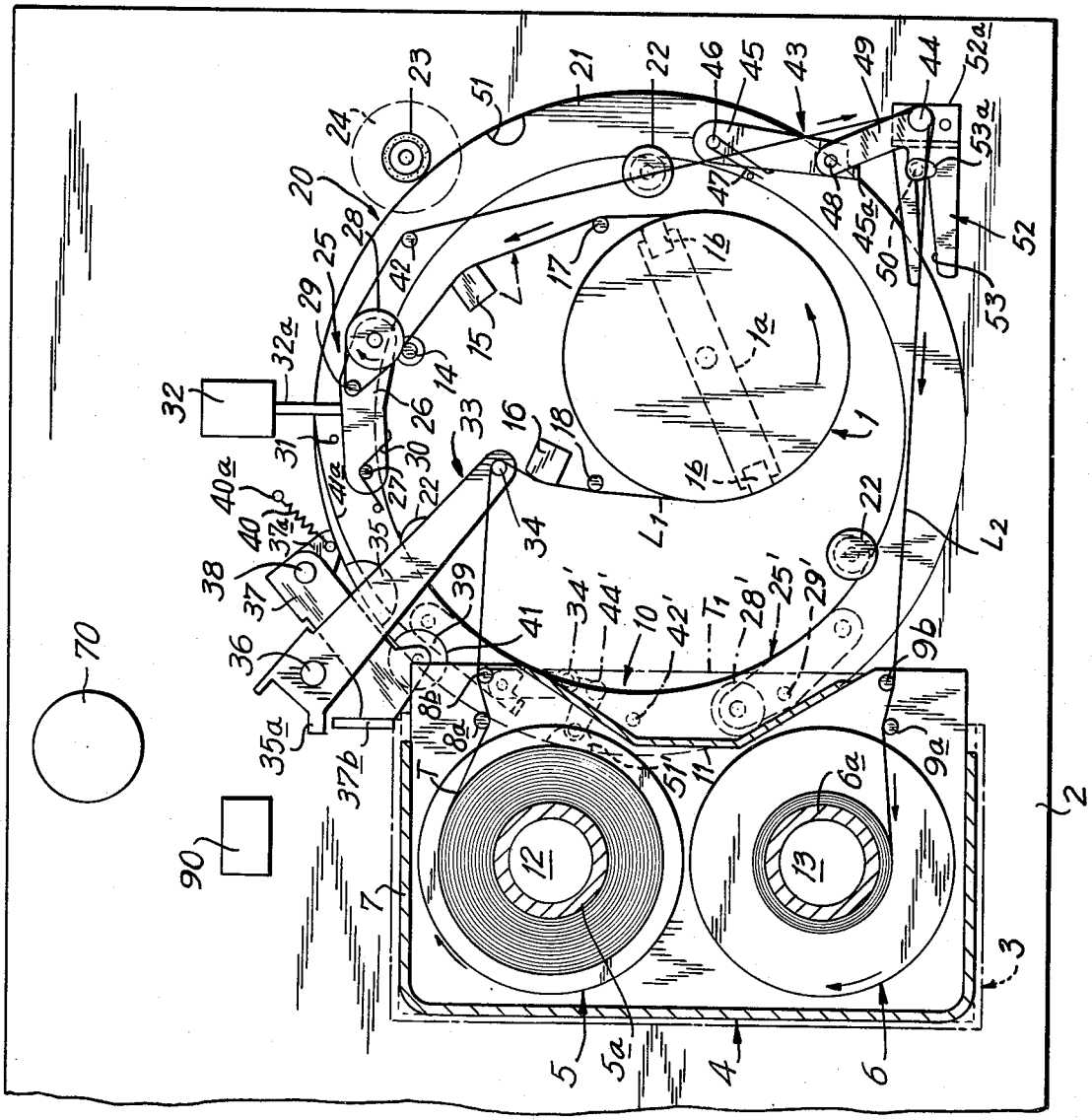
FIG. 1 is a schematic top plan view of a video tape recording and/or reproducing apparatus having a tape loading and unloading device, and which is of a type to which the present invention is applied.

Referring to the drawings in detail, and initially to FIG. 1 thereof, it will be seen that a magnetic recording and/or reproducing apparatus to which this invention is applied may be of the type disclosed in detail in U.S. Pat. No. 3,833,921, issued Sept. 3, 1974 and having a common assignee herewith. Such apparatus is shown to comprise a cylindrical tape guide drum 1 mounted on a chassis 2 and having a circumferential slot or gap (not shown), and a rotary magnetic head assembly 1a (appearing in broken lines) rotatably mounted on drum 1 and including one or more magnetic heads 1b which are moved along the slot or gap, that is, in a circular path substantially coinciding with the peripheral surface of drum 1.

A cassette holding device, shown schematically in broken lines and indicated generally by the reference numeral 3, is suitably mounted on a chassis 2 in front of guide drum 1 and is movable between a raised position, in which holding device 3 is adapted to receive a tape cassette 4, and a lowered or operative position, in which the cassette is positioned for a recording or reproducing operation. The tape cassette 4 is shown to include a supply reel 5 and a take-up reel b rotatably contained within a housing 7 and having a magnetic tape T wound thereon. The tape T extending between reels 5 and 6 is guided about guide pins 8a and 8b adjacent reel 5 and about guide pins 9a and 9b adjacent reel 6 so as to normally follow a path including a run, indicated in broken lines at $T_1$, between guide pins 8b and 9b at which the tape is exposed through an opening 10. The opening 10 extends along the side and adjacent bottom portion of housing 7 which is directed toward guide drum 1 when cassette 4 is received by holding device 3. Access to the interior of cassette housing 7 through opening 10 is limited by a partition 11 which extends along the edge of opening 10 in the bottom wall of housing 7 from near guide pin 8b to near guide pin 9b, and which is spaced inwardly from the run $T_1$ of the tape.

Rotatable reel support members 12 and 13 extend upwardly from chassis 2 and are respectively engageable by the hubs 5a and 6a of supply reel 5 and takeup reel 6 when holding device 3 is lowered to its operative position with the cassette 4 received therein. Suitable drive assemblies (not shown) may be provided for driving takeup reel support member 13 in the direction winding the tape T on takeup reel 6 during recording, reproducing and fast-forward operations of the apparatus, and for driving supply reel support member 12 in the direction for rewinding the tape on supply reel 5 during rewinding operation of the apparatus.

The recording and/or reproducing apparatus further includes a capstan 14 which is suitably driven from a drive motor (not shown), a fixed magnetic head assembly 15 for recording and/or reproducing audio and control signals, an erasing head 16 and tape guides 17 and 18, all of which are mounted on chassis 2 at predetermined spaced apart positions, as shown. In order to operate the magnetic recording and/or reproducing apparatus, it is necessary to load the tape from cassette 4 on holding device 3 about at least a portion of the circumferential surface of guide drum 1 for scanning by the rotary magnetic head assembly 1a associated with the guide drum, and further to engage the magnetic tape with capstan 14 for driving by the latter and also with the fixed magnetic heads 15 and 16. When it is desired to remove the cassette 4 from the apparatus at the conclusion of a recording or reproducing operation, it is necessary to unload the tape from about drum 1 and to return the tape to the cassette 4.

In the illustrated apparatus, a device 20 for performing the above described tape loading and unloading functions is shown to generally include a support member 21, preferably in the form of a ring, and which is rotatable about guide drum 1 in a circular or arcuate path that extends under the opening 10 of a cassette 4 positioned by the holding device 3. The support ring 21 may be disposed eccentrically with respect to guide drum 1, to provide a relatively large space therebetween for accommodating capstan 14, heads 15 and 16 and tape guides 17 and 18. Support ring 21 is shown to be rotatably supported by grooved rollers 22 which engage the inner periphery of ring 21 and which are suitably mounted above chassis 2. In order to effect turning of support ring 21 about guide drum 1, the outer periphery of ring 21 is frictionally engaged by a drive roller 23 which is rotatable by a suitable reversible electric motor 24.

Mounted on support ring 21 is a tape engaging assembly 25 which is shown to include a support arm 26 pivoted, at one end, on a pin 27 projecting upwardly from ring 21, a freely rotatable, upstanding pinch roller 28 carried by the opposite or free end portion of arm 26, and a tape engaging member or pin 29 extending upwardly from arm 26 intermediate its ends. The tape engaging assembly 25 is located on support ring 21 so that, when the support ring is turned to its operative position to dispose assembly 25 as shown in full lines on FIG. 1, pinch roller 28 is adjacent capstan 14 for cooperation with the latter in driving the magnetic tape therebetween. In the apparatus as shown, a spring 30 acts on support arm 26 to urge the latter outwardly relative to ring 21 against a stop 31 for providing a small gap between pinch roller 28 and capstan 14, and an additional mechanism, indicated schematically at 32, may be provided to angularly displace support arm 26 in the inward direction for pressing pinch roller 28 against capstan 14. Such additional mechanism 32 may be simply constituted by a solenoid having an armature 32a which is extended in response to the energization of the solenoid during a recording or reproducing operation of the apparatus so as to cause inward movement of arm 26, for example, by direct action of armature 32a on arm 26, as shown.

When support ring 21 is turned in the clockwise direction through approximately 250° from its operative position shown in full lines on FIG. 1 to its starting or inactive position, the tape engaging assembly is at the location indicated in broken lines at 25' on FIG. 1. It will be apparent that, with support ring 21 at its starting or inactive position, the downward movement of holding device 3 with a cassette 4 positioned thereon causes the pinch roller and the tape guiding member at the positions indicated at 28' and 29', respectively, to project upwardly into opening 10 of cassette housing 7 at the side of tape run $T_1$ facing away from guide drum 1.

Tape loading and unloading device 20 is further shown to include a tape shifting assembly 33 which, as hereinafter described in detail, may form part of a tension regulating or control device according to this invention and which is shown on FIG. 1 to include a pin 34 projecting upwardly from one end of a support arm 35 extending swingably over ring 21 from a shaft 36 journalled in chassis 2.

As will be hereinafter described in detail, support arm 35 is spring urged in the counterclockwise direction, that is, in the direction for moving pin 34 from its inoperative position indicated at 34' to its operative position shown in full lines on FIG. 1. A control member or lever 37 for controlling the movements of pin 34 may be pivoted, at one end, on a pin 38 carried by chassis 2 adjacent ring 21 and carries a rotatable cam follower roller 39 which is urged against the periphery of support ring 21 by a spring 40 connected between an arm 37a of lever 37 and an anchor 40a on the chassis.

The free end portion of lever 37 extends adjacent the pivoted end of support arm 35 and has an upstanding lug 37b engageable by an extension 35a of arm 35 for limiting the spring-urged swinging of the latter in the counterclockwise direction. The periphery of support ring 21 is formed with a recess 41 located to receive cam follower roller 39 when support ring 21 is in its operative position (FIG. 1). The periphery of ring 21 is further formed with a cam surface 41a extending from recess 41 in the counterclockwise direction and being at progressively decreasing radial distances from the center of rotation of ring 21 in the clockwise direction, that is, in the direction toward recess 41, so as to be engageable by cam follower roller 39 during turning of support ring 21 between its inactive or starting position and its operative position.

With support ring 21 in its inactive position, the engagement of roller 39 with the portion of cam surface 41a at a relatively large radial distance from the rotational center of ring 21 disposes control lever 37 so that its lug 37b engaged by extension 35a of lever 35 places pin 34 in its inoperative position indicated at 34' so as to project upwardly into opening 10 of cassette or housing 7. When support ring 21 is turned in the counterclockwise direction during a tape loading operation, cam follower roller 39 rides on successive portions of cam surface 41a that are at progressively decreasing radial distances from the rotational center of ring 21 so that control lever 37 turns gradually in the counterclockwise direction about pivot 38. The resulting movement of lug 37b ahead of extension 35a permits the spring-urged arm 35 to gradually turn in the counterclockwise direction so that pin 34 moves out of cassette 4 and correspondingly shifts the tape engaged thereby. At the completion of the tape loading operation, that is, when ring 21 arrives at its operative position (FIG. 1), cam follower roller 39 is received in recess 41 so that control lever 37 is further turned in the counterclockwise direction to move lug 37b away from extension 35a and thereby permit turning of arm 35 in the same direction for disposing pin 34 in its operative position at which the tape is sufficiently wrapped about guide drum 1 and engaged with erasing head 16.

An upstanding tape guide pin 42 is also shown to be mounted on support ring 21 at a fixed location spaced by a relatively small distance from pinch roller 28 in the clockwise direction so that, when support ring 21 is in its starting or inactive position, such tape guiding pin will be at the location indicated in broken lines at 42' for projecting upwardly into opening 10 of cassette housing 7 received by the lowered cassette holder 3.

The illustrated tape loading and unloading device 20 is further shown to comprise a tape guiding assembly 43 which is mounted on support ring 21 and includes a tape guiding member or pin 44. As disclosed in detail in said U.S. Pat. No. 3,833,921, tape guiding member 44 is mounted on support ring 21 for movement relative to the latter from an inner position indicated in broken lines at 44', at which such tape guiding member is spaced from pinch roller 29' by a relatively small distance along ring 21 in the clockwise direction so as to also project upwardly into cassette opening 10 with the support ring 21 at its starting position, to an outer position shown in full lines on FIG. 1 in response to movement of the support ring to its operative position during a loading operation, at which outer position tape guiding member 44 is spaced outwardly from support ring 21 and also spaced a relatively large distance from pinch roller 28 in the clockwise direction along support ring 21. In order to permit the foregoing movements of tape guiding member 44 relative to ring 21, tape guiding assembly 43 is shown to include an arm 45 pivoted, at one end, on a pin 46 carried by ring 21 and being urged by a spring 47 in the counterclockwise direction relative to ring 21. The free end portion of arm 45 carries a pin 48 on which there is pivoted one end of a generally L-shaped support arm 49 having the tape guiding member or pin 44 projecting upwardly therefrom, and the free end of L-shaped arm 49 has a locating pin 50 depending therefrom. Further, the free end of arm 45 has an upwardly bent tab 45a engageable by arm 49 for limiting the clockwise turning of arm 49 relative to arm 45. When support ring 21 is in its starting or inactive position, the turning of arm 45 in the counterclockwise direction by spring 47 is limited to the position shown in broken lines on FIG. 1 by the engagement of depending pin 50 on arm 49 in a recess 51 formed in the top of support ring 21 and which is then at the position 51', and by the engagement of tab 45a with the adjacent arm 49. With arms 45 and 49 being thus located, arms 45 and 49 extend generally along ring 21 from pivot pin 46 in the direction towawrd pinch roller 28, and tape guiding member or pin 44 is disposed at its inner position relatively close to pinch roller 28.

In order to move tape guiding member or pin 44 from such inner position to its outer position in response to turning of support ring 21 from its starting position to its operative position tape loading and unloading device 20 is further shown to comprise an actuating member 52 which is fixedly located on chassis 2 at a location adjacent support ring 21 past which pivot pin 46 moves during the turning of support ring 21 between its starting and operative positions. Actuating member 52 includes a base portion 52a secured to chassis 2 and an elongated, elevated portion 52b which projects from base portion 52a over the outer periphery of ring 21. Elevated portion 52b has an elongated slot 53 opening at the free end of portion 52b for receiving locating pin 50 of tape guiding assembly 43 as ring 21 is moved from its starting or inactive position toward its operative position. Slot 53 is shown to diverge from ring 21 in the direction from its open end toward its opposite end which terminates in a laterally enlarged locking portion 53a.

The tape loading and unloading device 20, insofar as it is described above, operates as follows:

Starting with support ring 21 in its starting or inactive position so that the tape engaging assembly 25, tape guiding assembly 43, pin 34 and tape guiding pin 42 are in the positions shown in broken lines at 25', 43', 34' and 42', respectively, on FIG. 1, a cassette 4 is disposed on holding device 3 and the latter is lowered to its operative position for causing pinch roller 28', tape engaging member 29', pins 34' and 43', and tape guiding member 44' to extend upwardly into cassette opening 10 at the side of tape run $T_1$ facing away from guide drum 1. Motor 24 is then suitably energized to cause drive roller 23 to turn support ring 21 in the counterclockwise direction. Such rotation of ring 21 causes tape engaging member 29 to draw a loop L of the tape T from cassette 4 and to wrap a side $L_1$ of the tape loop about a portion of the periphery of guide drum 1. It will be noted that, as the tape loop L is thus formed by tape engaging member 29, pinch roller 28, pins 34 and 42 and tape guiding member 44 are all disposed within the tape loop. During continued turning of ring 21 in the counterclockwise direction, the tape loop L is progressively extended and its side $L_1$ is further wrapped about the periphery of guide drum 1, while the other side $L_2$ of tape loop L is engaged successively by tape guide pin 42 and tape guiding member 44 and thereby held away from the periphery of guide drum 1. In the course of the counterclockwise turning of ring 21, locating pin 50 enters slot 53 of actuating member 52 (FIG. 4) and moves along slot 53 toward the locking portion 53a. As pin 50 moves along slot 53 and pivot pin 46 continues in the counterclockwise direction along the circular path of ring 21, arms 45 and 49 initially swing as a unit in the clockwise direction about pivot pin 46 and, when locating pin 50 reaches the closed end of slot 53 defined by locking portion 53a, arm 49 jack-knifes in the counterclockwise direction relative to arm 45 and causes rapid turning of arm 45 in the clockwise direction about pivot pin 46. Thereafter, continued movement of pivot pin 45 in the counterclockwise direction along the circular path of ring 21, while locating pin 50 is retained in locking portion 53a of slot 53, causes arm 49 to turn in the clockwise direction relative to arm 45 until arm 49 again abuts against tab 45a on arm 45, for example, as shown in full lines on FIG. 1. Thus, tape guiding member 44 is moved to its outer position relative to ring 21 and, in so doing, is also relatively widely spaced from the tape engaging member 29 and pinch roller 28 in the direction along support ring 21.

As support ring 21 nears its operative position shown in full lines on FIG. 1, cam follower roller 39 is received in recess 41 to permit control lever 37 to pivot to the illustrated position, whereby arm 35 can be spring-urged to dispose pin 34 at the position shown in full lines at which it acts on the tape loop side $L_1$ between drum 1 and guide pin 8b to cause loop side $L_1$ to engage guide pin 18 and erase head 16. When support ring 21 attains its operative position, the tape loop side $L_1$ between drum 1 and tape engaging member 29 is engaged with guide pin 17 and head assembly 15 and passes between capstan 14 and pinch roller 28 which is disposed adjacent the capstan. Thus, the tape loading operation is completed and the operation of motor 24 is suitably discontinued. Upon the completion of the tape loading operation, a recording or reproducing operation can be initiated, and during such operation tape T is transported about guide drum 1 from supply reel 5 to take-up reel 6, for example, by energizing solenoid 32 to cause pinch roller 28 to press the tape against rotated capstan 14 and by suitably rotating take-up reel support member 13.

At any desired time, the recording or reproducing operation can be discontinued, and an unloading operation initiated by suitably operating motor 24 to drive support ring 21 in the clockwise direction from the position shown in full lines to the position shown in broken lines on FIG. 1. During such turning of ring 21, one or the other of reel shafts 12 and 13 may be suitably rotated to take up, on the respective reel 5 or 6, the slack tape that results from the movement of tape engaging member 29 and the consequent reduction of the size of tape loop L. Further the action of tape guiding assembly 43 is reversed in passing from the condition shown in full lines on FIG. 1 to the condition shown in broken lines.

Upon the return of support ring 21 to its starting or inactive position, the tape T is fully unwrapped from guide drum 1 and restored to the run $T_1$ between guide pins 8b and 9b in cassette 4. Further, pinch roller 28, tape engaging member 29, tape guiding pins 34 and 42 and tape guiding member 44 are restored to the positions within cassette opening 10 as indicated in broken lines at 28', 29', 34', 42' and 44', respectively. Thus, the holding device 3 can be raised to permit the removal of cassette 4 therefrom.

Figure 2:
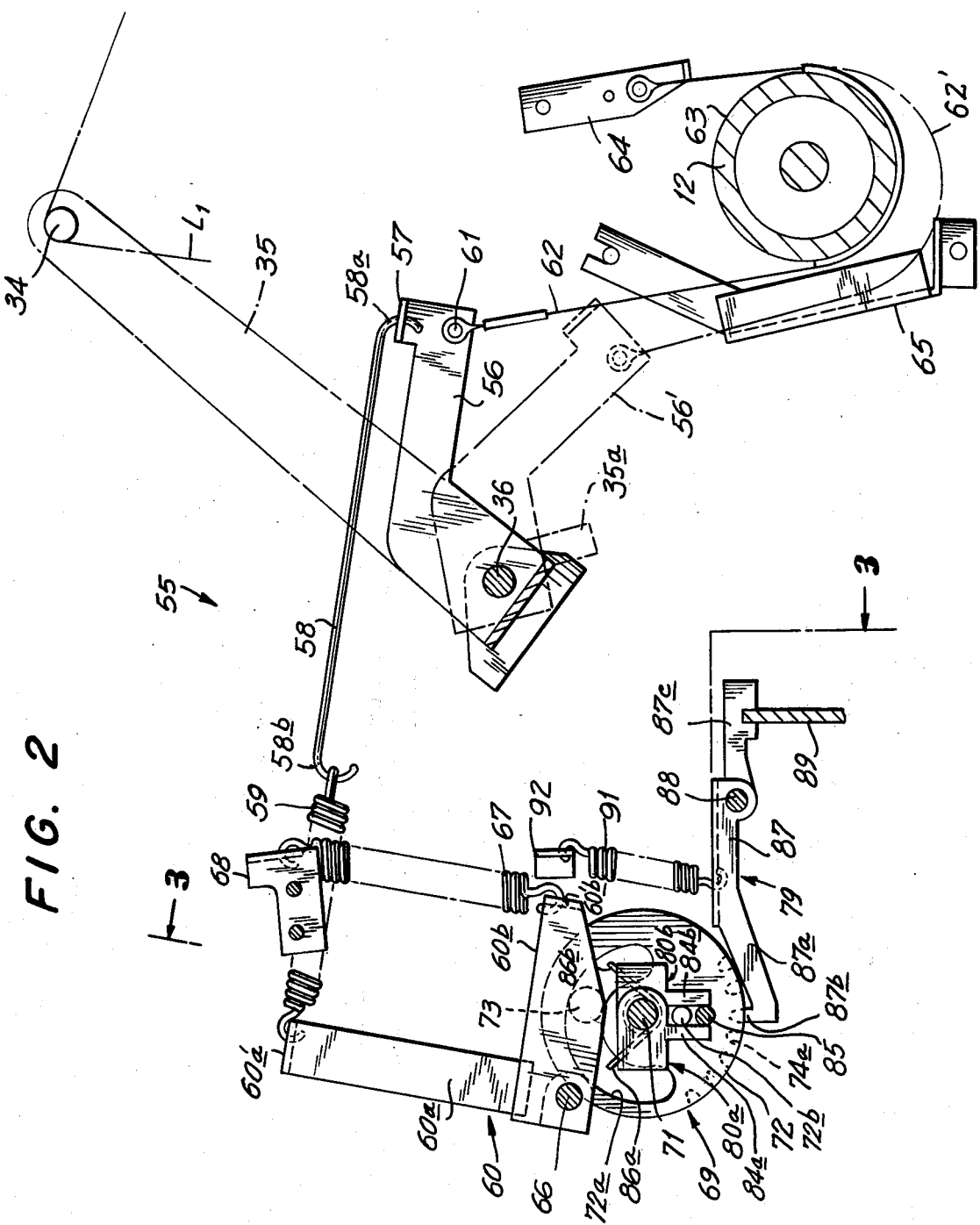
FIG. 2 is an enlarged top plan view of a tension control device according to this invention provided in the apparatus of FIG. 1, with a portion of the chassis of the latter being cut away to show the elements of the tension control device disposed therebelow.

Referring now to FIG. 2, it will be seen that the above described recording and/or reproducing apparatus may be provided with a tension control device 55 according to this invention which, as previously indicated, may include the pivoted arm 35 and tape engaging pin 34 of tape shifting assembly 33. In the tension control device 55, as shown, an arm 56, which may be an integral extension of support arm 35, is swingable with the latter about the axis defined by shaft 36 and has an apertured lug 57 which receives one hooked end 58a of a link rod 58. The other hooked end 58b of rod 58 is connected to one end of a tensioning spring 59 which has its other end anchored to an anchor member 60. It will be apparent that the force of spring 59 transmitted to extension 56 of arm 35 by way of rod 58 urges arm 35 in the counterclockwise direction, as viewed, that is, in the direction for moving pin 34 to its operative position as the lug 37b on control lever 37 moves away from extension 35a of arm 35 in response to the movement of ring 21 to its operative position, as previously described. Thereafter, during recording and reproducing operations of the apparatus, pin 34 on arm 35 continues to be urged against the tape run $L_1$ by the force of spring 59.

In order to control the tension in tape run $L_1$ during recording and reproducing operations, that is, when the tape T is transported about guide drum 1 from supply reel 5 to take-up reel 6 by the cooperative action of capstan 14 and pinch roller 28 and by the rotation of take-up reel support member 13, the extension 56 of support arm 35 is further connected, as at 61, to one end of a brake band 62 which extends around a drum surface 63 on supply reel support member 12 and has its other end secured to an anchor 64 on the chassis. Thus, when arm 35 is turned in the counter-clockwise direction by spring 59, for example, in response to a reduced tension in tape run $L_1$, brake band 62 is tightened against drum surface 63 to increase the braking force, and hence resistance to unwinding of tape from the associated supply reel. Conversely, if the tension in tape run $L_1$ exceeds the desired value, as established by the force of spring 59, the clockwise turning of arm 35 aginst the force of spring 59 serves to loosen brake band 62 and thereby decrease the resistance to unwinding of the tape from the supply reel. Accordingly, the arm 35 and its tape engaging pin 34 and brake band 62 cooperate during recording and reproducing operations to maintain a substantially constant tension in tape run $L_1$, with the value of such tension being determined by the force of spring 59.

Of course, when arm 35 of tape shifting assembly 33 is moved to its inoperative position in response to the disposition of support ring 21 to its starting or inactive position, as described above, extension 56 of arm 35 is turned in the clockwise direction from the position shown on FIG. 2, for example, to the position indicated in broken lines at 56', with the result that brake band 62 is substantially loosened in respect to brake drum 63, for example, as indicated in broken lines at 62'. In order to ensure that the loosened brake band 62' will remain at the level of brake drum 63 for subsequent engagement therewith during a recording or reproducing operation, a guide member 65 may be mounted on the chassis adjacent supply reel support member 12 to define a guide channel facing toward the latter and adapted to receive the loosened brake band, as shown.

In order to provide for adjustment of the force of tensioning spring 59, and hence of the constant tension that is maintained in tape run $L_1$ during recording and reproducing operations, anchor member 60 is movably mounted, for example, pivoted on a pin 66 extending from chassis 2, so that angular displacement of anchor member 60 about pivot pin 66 is effective to increase or decrease the force of spring 59 applied through rod 58 to urge arm 35 in the counterclockwise direction, and thereby to increase or decrease, respectively, the value of the constant tension maintained in tape run $L_1$ during recording and reproducing operations.

In accordance with this invention, the anchor member 60 is substantially counterbalanced in respect to the force of tensioning spring 59, for example, by means of an additional spring 67 acting to urge anchor member 60 in the direction opposed to that in which the anchor member is urged by the force of tensioning spring 59. By reason of such counter-balancing of anchor member 60, the latter can be angularly displaced for varying the force of tensioning spring 59, as hereinafter described, without having to overcome the entire force of such tensioning spring.

More specifically, in the illustrated embodiments of the invention, anchor member 60 is shown to be in the form of a lever having arms 60a and 60b which extend radially from the axis of pivot pin 66 substantially at right angles to each other, and which have appertures lugs 60'a and 60'b at their free ends to which hooked ends of springs 59 and 67 are respectively attached. Further, the hooked end of spring 67 remote from the end of the latter connected to lever arm 60b is attached to an apertured bracket or anchor 68 secured to the chassis. Thus, the force of tensioning spring 59 tends to angularly displace anchor member 60 in the clockwise direction, as viewed on FIG. 2, while the force of spring 67 tends to angularly displace anchor member 60 in the counterclockwise direction so as to substantially counter-balance the force of tensioning spring 59.

Figure 3:
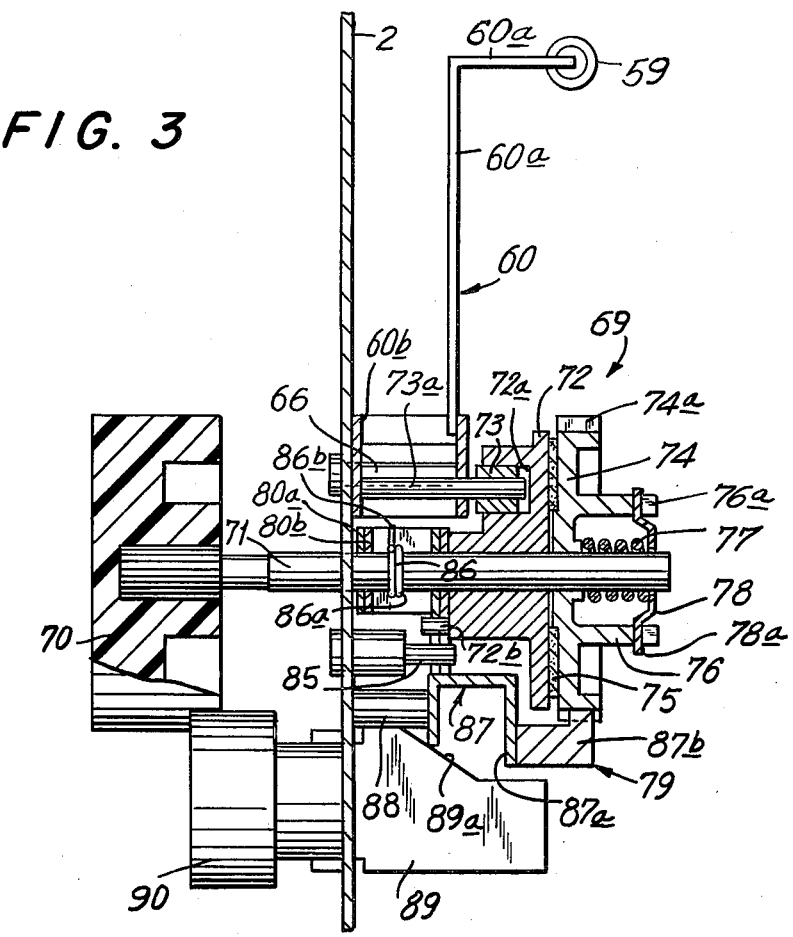
FIG. 3 is a sectional view taken along the line 3-3 on FIG. 2.

The tension control device 55 according to this invention is further shown to include a manually actuable mechanism 69 for angularly displacing the counter-balanced anchor member 60. As shown, such mechanism 69 may include a knob 70 (FIGS. 1 and 3) secured on the upper end portion of a shaft 71 which is suitably journalled in chassis 2, and a cam member 72 which is turnable with shaft 71 and engageable by a cam follower 73 on arm 60b of anchor member 60 (FIGS. 2 and 3). More specifically, it will be seen that cam member 72 is rotatable relative to shaft 71 and is urged to turn with the latter by means of a clutch disk 74 which is alidable on shaft 71 and has a layer 75 of friction material on the surface thereof confronting cam member 72 (FIG. 3). Clutch disk 74 may have a hub 76 within which a compression spring 77 is disposed around the lower end portion of shaft 71. A retaining cap 78 is suitably secured on the lower end of shaft 71 to provide a seat for spring 77 so that the latter urges clutch disk 74 axially upward against cam member 72. Further, retaining cap 78 has peripheral lugs 78a engageable in corresponding notches 76a in the edge of hub 76 for rotatably coupling clutch disk 74 to shaft 71. The periphery of clutch disk 74 is preferably provided with a circumferential series of teeth 74a which, as hereinafter described in detail, are engageable by a lock mechanism 79 for holding clutch disk 74, in any selected rotational position.

Cam member 72 may have an arcuate cam groove 72a formed in its upper surface so as to be eccentrically disposed in respect to the axis of rotation of member 72 with shaft 71. Further, cam follower 73 may be in the form of a roller which is slidably received in cam groove 72a and is rotatable on a pin 73a (FIG. 3) depending from arm 60b of anchor member 60. It will be apparent that, by reason of the eccentricity of arcuate cam groove 72a in respect to the axis of cam member 72, the opposite end portions of cam groove 72a are at different radial distances from the axis of shaft 71. Thus, turning of cam member 72 in the clockwise direction from the central or neutral position shown on FIG. 2 is effective to displace cam follower 73 away from the axis of shaft 71 so as to turn anchor member 60 in the counterclockwise direction and thereby increase the force of tensioning spring 59. Conversely, turning of cam member 72 in the counterclockwise direction from the central or neutral position of FIG. 2 is effective to turn anchor member 60 in the clockwise direction for decreasing the force of spring 59.

Figure 4:
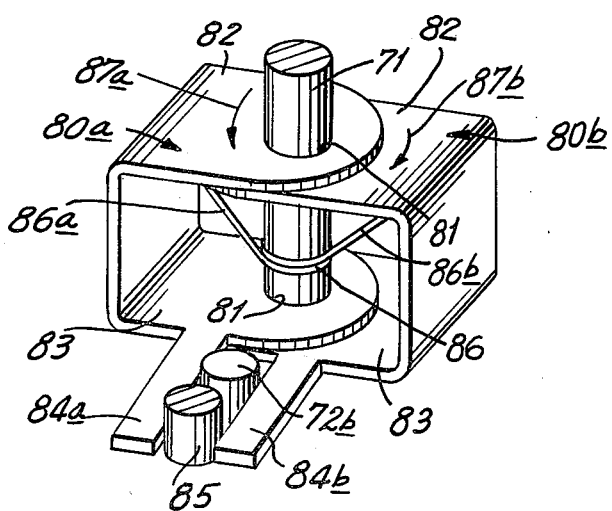
FIG. 4 is a detail perspective view showing a centering arrangement included in the tension control device.

Preferably, cam member 72 is yieldably urged to the central or neutral position shown on FIG. 2, that is, to a position in which cam follower 73 is located intermediate the opposite ends of cam groove 72a. In order to achieve the foregoing, the mechanism 69 is shown to further include a pair of oppositely facing C-shaped members 80a and 80b having aligned apertures 81 in their upper and lower legs 82 and 83 through which shaft 71 extends between cam member 72 and chassis 2 (FIGS. 2, 3 and 4). Fingers 84a and 84b extend from the lower legs 83 of members 80a and 80b, respectively, at one side of the latter, and a locating pin 72b projects axially upward from the hub of cam member 72 to engage between fingers 84a and 84b. Further, a stop pin 85 depends from chassis 2 and engages between fingers 84a and 84b, and a torsion spring 86 extends around shaft 71 and has end portions 86a and 86b that engage against members 80a and 80b to urge the latter in the directions of the arrows 87a and 87b, respectively (FIG. 4). Thus, fingers 84a and 84b are urged against stop pin 85 with locating pin 72b between fingers 84a and 84b so as to locate cam member 72 in its neutral or central position when fingers 84a and 84b engage stop pin 85 from the opposite sides of the latter. At this point, it should be noted that the force of spring 86 urging members 80a and 80b in the direction of arrows 87a and 87b, respectively, is relatively light and is, in any case, substantially less than the torque that can be transmitted from shaft 71 through clutch disk 74 to cam member 72 for turning the latter from its central or neutral position.

As shown on FIGS. 2 and 3, the lock mechanism 79 may be constituted by a lock lever 87 which is pivotally mounted intermediate its ends on a pivot pin 88 depending from chassis 2. One arm 87a of lever 87 extends adjacent the periphery of clutch disk 74 and terminates in a latch element 87b which is engageable between the peripheral teeth 74a of disk 74 for locking the latter in any selected rotational position. The other arm 87c of lever 87 extends adjacent the path of travel of a plunger 89 which is guided for vertical sliding movement through chassis 2 and which has a manually actuable pushbutton 90 on its upper end. A spring 91 (FIG. 2) is connected between arm 87a of lever 87 and an anchor 92 on the chasis for urging lever 87 in the clockwise direction, as viewed, that is, in the direction moving latch element 87b against the periphery of clutch disk 74 and moving lever arm 87c against an inclined edge 89a on plunger 89 (FIG. 3). The inclination of edge 89a is selected so that manual depression of pushbutton 90 will cause edge 89a to turn lever 87 in the counterclockwise direction from the position shown on FIG. 2, whereby to release latch element 87b from the teeth 74a of clutch disk 74 and permit turning of the latter with shaft 71.

During a video signal recording or reproducing operation of the magnetic recording and/or reproducing apparatus, the above described tension control device 55 according to this invention operates as follows:

In preparation for a video signal recording operation, pushbutton 90 is manually depressed to release lock mechanism 79 and thereby permit spring 86 to dispose members 80a and 80b in the position shown on FIG. 4, whereby locating pin 72b on cam member 72 is aligned with stop pin 85 between fingers 84a and 84b so as to dispose cam member 72 in its central or neutral position corresponding to a predetermined median force of spring 59. Thereafter, during a video signal recording operation, the tension in the tape run $L_1$ will be maintained substantially constant at a median value corresponding to the median force of spring 59.

In preparation for a video signal reprodudcing operation of the apparatus pushbutton 90 is again depressed to permit the initial disposition of cam member 72 at its central or neutral position, as described above. Thereafter, during the commencement of the signal reproducing operation, the resulting picture or image is viewed on a monitor or other image display device (not shown) to determine whether such picture contains the "snow" or disturbance characteristic of the inclusion of guard band noises in the reproduced video signals as a result of a change in the longitudinal dimensions of the magnetic tape in the interval between the recording of signals in oblique tracks on the tape and the reproducing of such signals. If such guard band noises are present, pushbutton 90 is depressed to release lock mechanism 79, and knob 70 is turned in one direction or the other so as to effect corresponding turning of cam member 72 by way of clutch disk 74. During such turning of cam member 72, locating pin 72b extending therefrom will act against either finger 84a or finger 84b so as to turn the respective member 80a or 80b about shaft 71 against the light force or resistance of spring 86.

As previously described, the turning of cam member 72 will be effective, through the engagement of cam follower 73 in cam groove 72a, to effect angular displacement of anchor member 60 for either increasing or decreasing the force of tensioning spring 59, and thereby either increasing or decreasing, respectively, the value of the tension that is maintained in the tape run $L_1$ by the cooperative action of arm 35 and brake band 62. The adjustment of the force of spring 59 is continued until the "snow" or disturbance characteristic of the guard band noises disappears from the picture or image displayed by the monitor, whereupon pushbutton 90 is released so as to permit spring 91 to return lock lever 87 to its operative position in which latch element 87b engages the peripheral teeth 74a of clutch disk 74 for holding cam member 72 in its rotationally adjusted position against the light force of spring 86 tending to return the cam member to its neutral or central position.

It will be noted that, when effecting the adjustment of the force of tensioning spring 59, as described above, the force applied by the operator to knob 70 need only be sufficient to substantially overcome the light force of spring 86 by reason of the fact that spring 67 substantially counter-balances anchor member 60 in respect to the force acting thereon by reason of tensioning spring 59. Further, it will be seen that the coupling provided between anchor member 60 and the shaft 71 of knob 70 by the cam groove 72a and cam follower 73 is substantially irreversible, that is, anchor member 60 is angularly displaced in response to turning of cam member 72, but a force tending to angularly displace anchor member 60 cannot cause turning of cam member 72. Further, it will be seen that the coupling or connection provided by the engagement of cam follower 73 in cam groove 72a provides a substantial mechanical advantage, that is, turning of knob 70 through a substantial angle is required to effect relatively smaller angular displacement of anchor member 60. By reason of the foregoing features of tension control device 55, the tension in the tape can be easily and precisely controlled during a video signal reproducing operation so as to compensate for a change in the longitudinal dimensions of the tape and thereby eliminate guard band noises from the reproduced signals.

It will also be apparent that the tension control device 55 according to this invention is readily embodied in a magnetic recording and/or reproducing apparatus of the described type, that is, an apparatus in which a tape loading and unloading device 20 is included for withdrawing the tape from a cassette and wrapping the withdrawn tape about the guide drum 1 having the rotary recording and reproducing heads 1b associated therewith. Furthermore, as described above, the tension control device 55 according to this invention may include, as parts thereof, the arm 35 and tape engaging pin 34 of the tape shifting assembly 33 included in the tape loading and unloading device 20, whereby to reduce the complexity of the overall recording and/or reproducing apparatus.

Although an illustrative embodiment of the invention has been described in detail herein with reference to the accompanying drawings, it is to be noted that the invention is not limited to that precise embodiment, and that various changes and modifications may be effected therein by one skilled in the art without departing from the scope or spirit of the invention as defined in the appended claims.

What is claimed is:

1. A tension control device for controlling the tension in a tape as the latter is being advanced from a supply reel to a take-up reel, comprising a movable tension control arm engageable with a run of the tape between said supply and take-up reels, a tensioning spring connected with said arm for urging the latter against the tape so that the positioning of said arm is dependent on the force of said tensioning spring and the tension of said tape run, braking means controllable by said positioning of the tension control arm for resisting rotation of the supply reel with a braking force which maintains a substantially constant tension in said tape run, an anchor member connected with said tensioning spring and being movable for adjusting the force of said tensioning spring and thereby varying said substantially constant tension maintained in said tape run, an additional spring acting on said anchor member in opposition to said tensioning spring for substantially counter-balancing the force of said tensioning spring in respect to said anchor member, and manually actuable control means coupled with the counter-balanced anchor member for effecting movements of the latter.

2. A tension control device according to claim 1; in which said manually actuable control means includes a manually displaceable control element, and irreversible coupling means connected with said control element and said anchor member for providing a substantial mechanical advantge in respect to the displacement of said control element relative to the resulting movement of said anchor member.

3. A tension control device according to claim 2; in which said irreversible coupling means includes a cam member movable with said control element, and a cam follower on said anchor member engaging said cam member.

4. A tension control device according to claim 3; in which sid anchor member is constituted by a pivoted lever having said tensioning spring connected to one end of said lever, and said additional spring is connected to the other end of said lever for urging the latter in the direction opposed to the force of said tensioning spring.

5. In a magnetic recording and/or reproducing apparatus that includes a cylindrical tape guide drum with at least one rotary magnetic head moved in a circular path substantially coinciding with the periphery of said drum, tape supply means containing a magnetic tape wound on supply and take-up reels and extending therebetween, a capstan spaced from said guide drum, holder means spaced from said guide drum for receiving and positioning said tape supply means; a tape loading and unloading device comprising support means rotatable around said drum between inactive and operative positions in an arcuate path that extends adjacent said capstan and said holder means, tape engaging means including a pinch roller mounted on said support means and being movable with the latter in said arcuate path for engaging the tape between the supply and take-up reels of the tape supply means positioned on said holder means with said support means in said inactive position and for withdrawing a progressively extended loop of said tape from said supply means and wrapping one side of the extended tape loop about at least a portion of said periphery of the guide drum in response to movement of said support means from said inactive position to said operative position at which said pinch roller is located within said tape loop adjacent said capstan with the tape of said loop therebetween for driving the tape from said supply reel to said take-up reel, a pivoted tape shifting arm carrying a tape shifting pin and being movable between an inoperative position where said tape shifting pin engages the tape between said reels within said tape supply means and an operative position where said tape shifting pin shifts said one side of the tape loope between said guide drum and said supply reel of the tape supply means in the direction increasing the extent of said portion of the guide drum periphery about which the tape is wrapped in response to movement of said support means to said operative position, means for moving said tape shifting arm between said inoperative and operative positions thereof in response to the rotational positioning of said support means in said inactive position and said operative position, respectively of said support means; and a tension control device including a tensioning spring acting to urge said tape shifting pin against the tape in said operative position of said tape shifting arm, braking means controllable by said tape shifting arm in said operative position of the latter for resisting rotation of the supply reel with a braking force which maintains a substantially constant tension in the tape engaged by said pin in dependence on the force of said tensioning spring, an anchor member connected with said tensioning spring and being movable for adjusting said force of the tensioning spring and thereby varying said substantially constant tension maintained in the tape, means substantially counter-balancing the force of said tensioning means in respect to said anchor member, and manually actuable control means coupled with the counter-balanced anchor member for effecting movements of the latter.

6. A tension control device for controlling the tension in a tape as the latter is being advanced from a supply reel to a take-up reel, comprising a movable tension control arm engageable with a run of the tape between said supply and take-up reels; a tensioning spring connected with said arm for urging the latter against the tape so that the positioning of said arm is dependent on the force of said tensioning spring and the tension of said tape run; braking means controllable by said positioning of the tension control arm for resisting rotation of the supply reel with a braking force which maintains a substantially constant tension in said tape run; an anchor member connected with said tensioning spring and being movable for adjusting the force of said tensioning spring and thereby varying said substantially constant tension maintained in said tape run; means substantially counter-balancing the force of said tensioning spring in respect to said anchor member; and manually actuable control means coupled with the counter-balanced anchor member for effecting movements of the latter including a manually rotatable control knob having a frictional clutch element rotatably connected thereto, a cam member urged to rotate with said knob by means of said frictional clutch element and a cam follower on said anchor member engaging said cam member, said cam member and cam follower forming irreversible coupling means between said control knob and anchor member for providing a substantial mechanical advantage in respect to the displacement of said control knob relative to the resulting movement of said anchor member.

7. A tension control device according to claim 6; in which said cam member has an arcuate cam groove which is eccentrically disposed in respect to the axis of rotation of said cam member and in which said cam follower is slidably received; and further comprising means yieldably urging said cam member to a neutral position at which said cam follower is disposed approximately at the middle of said cam groove.

8. A tension control device according to claim 7; further comprising lock means for releasably holding said cam member in selected rotational positions displaced from said neutral position.

* * * * *